United States Patent [19]
Ryba et al.

[11] Patent Number: 5,280,592
[45] Date of Patent: Jan. 18, 1994

[54] DOMAIN INTERLOCK

[75] Inventors: Edward G. Ryba, Milpitas; Theodore C. Bernard, San Jose, both of Calif.

[73] Assignee: Amdahl Corporation, Sunnyvale, Calif.

[21] Appl. No.: 816,801

[22] Filed: Jan. 3, 1992

[51] Int. Cl.$^5$ .............................................. G06F 9/38
[52] U.S. Cl. .................... 395/375; 364/DIG. 1; 364/231.8; 364/228.7; 364/230; 364/230.3; 364/262.4; 364/281.3; 364/281.5
[58] Field of Search ................... 395/375, 725

[56] References Cited

U.S. PATENT DOCUMENTS

| | | | |
|---|---|---|---|
| 4,855,947 | 8/1989 | Zymslowski et al. | 395/375 |
| 4,888,689 | 12/1989 | Taylor et al. | 395/425 |
| 4,991,080 | 2/1991 | Emma et al. | 395/375 |

Primary Examiner—Debra A. Chun

[57] ABSTRACT

A pipeline interlock mechanism which insures the logical integrity of architected control quantities when used to access Domain Storage from Control State. A hardware Domain Interlock (DOMI) is provided to detect the start of execution in Control State of any instruction which modifies architected controls governing the access of Domain storage, and which insures that any subsequent potential access to Domain storage remains interlocked in the D-cycle until the modified controls become valid.

23 Claims, 8 Drawing Sheets

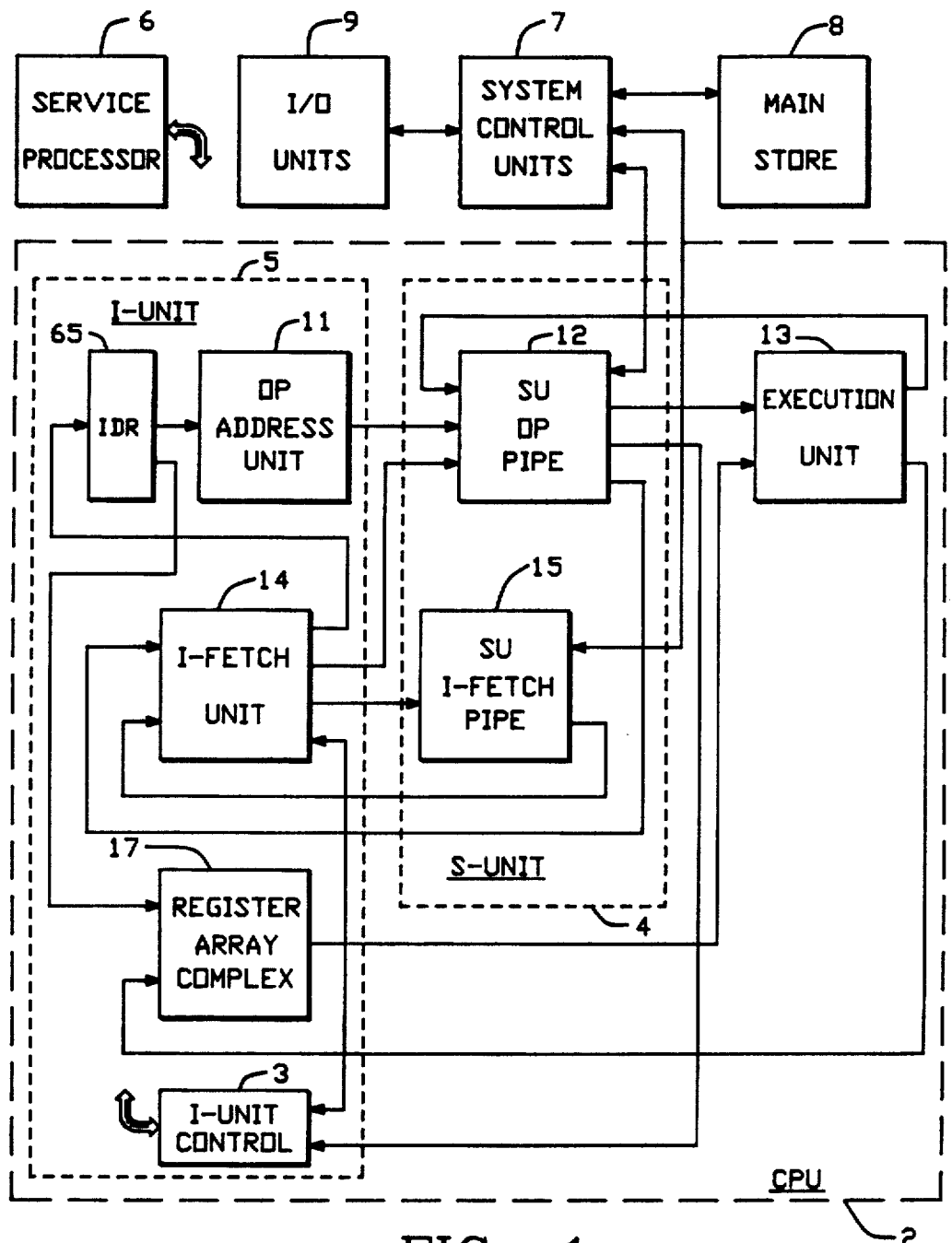
FIG.-1
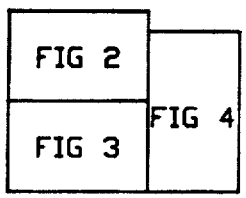

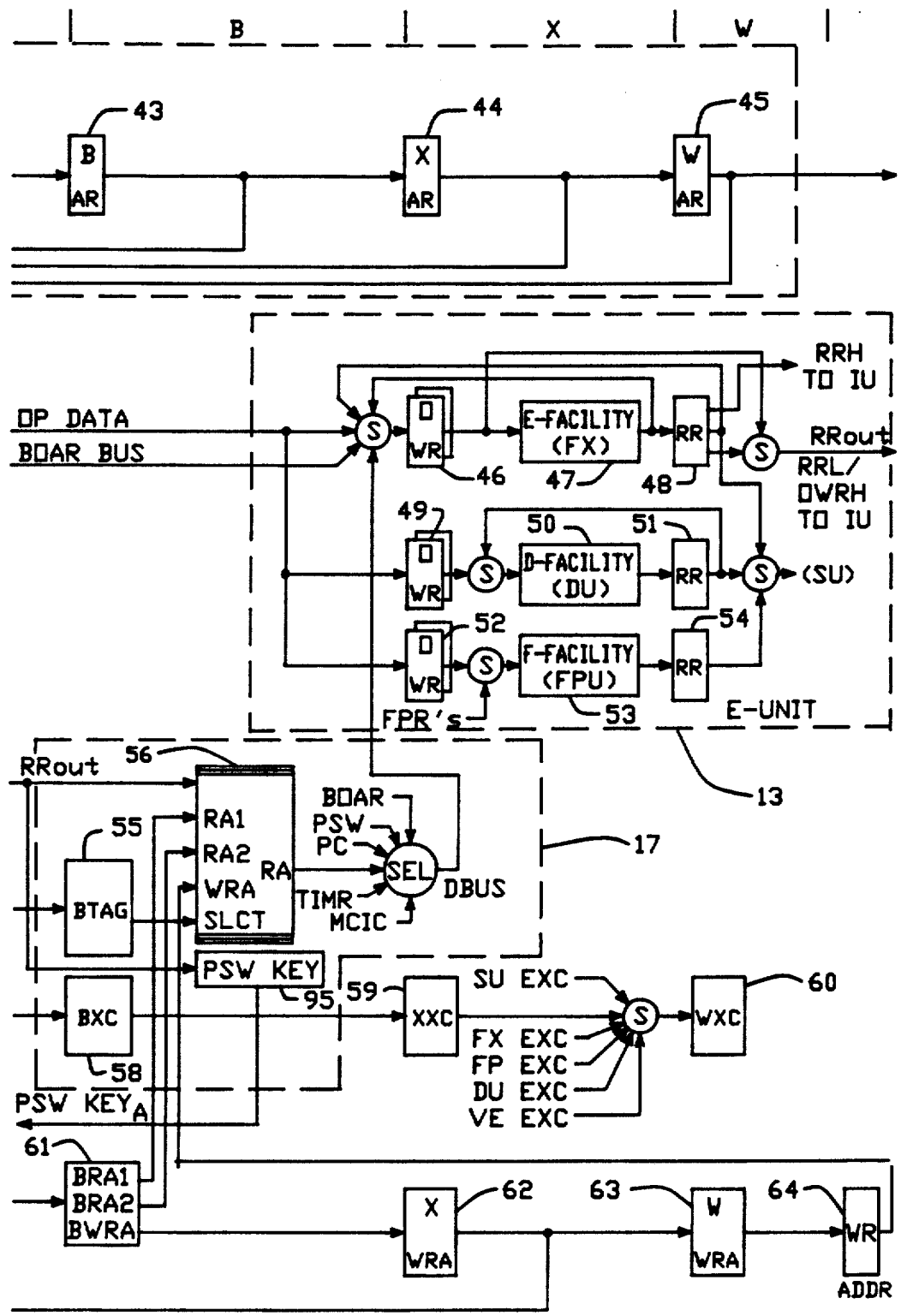
FIG.—4

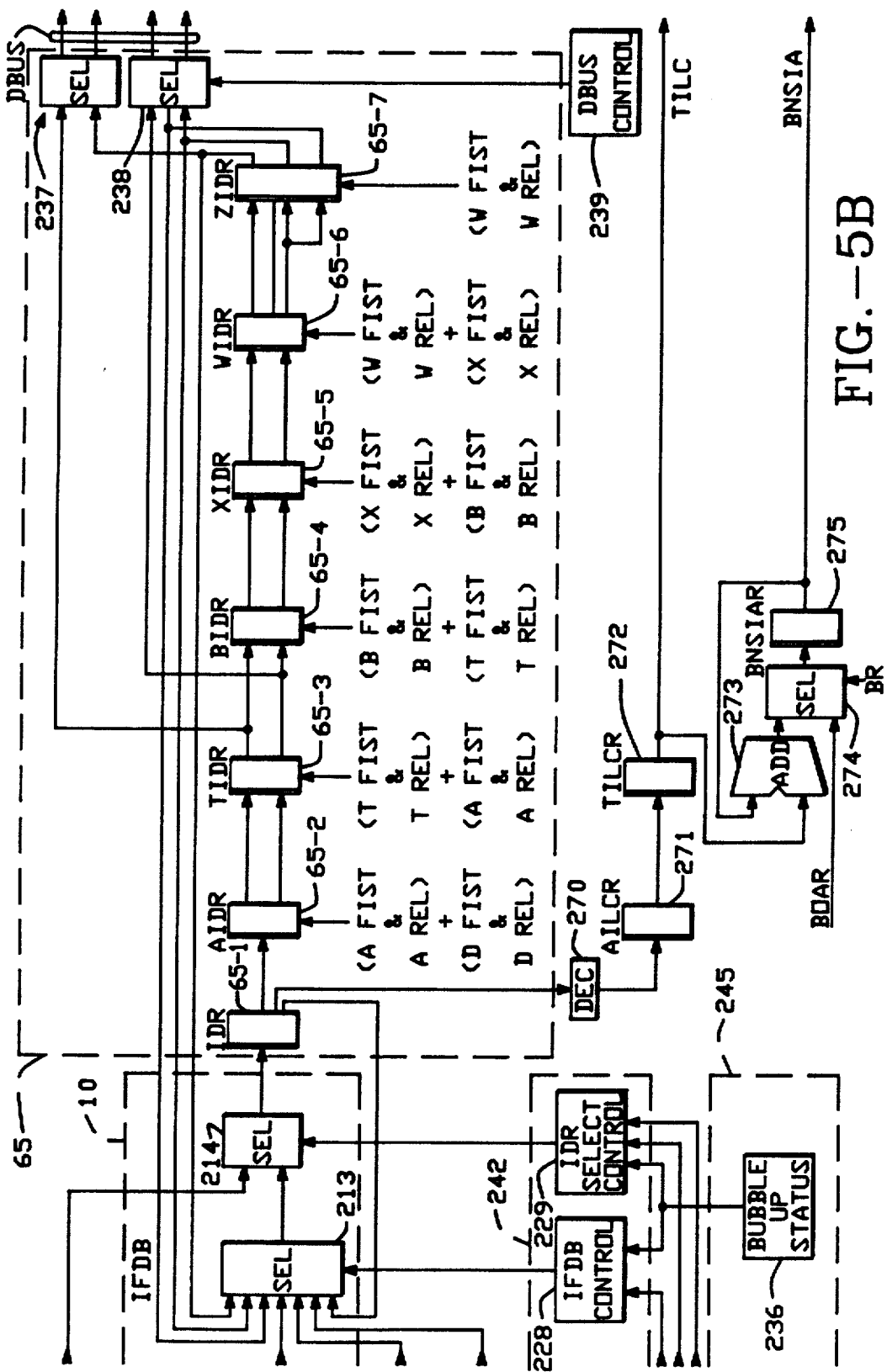
FIG.—5B

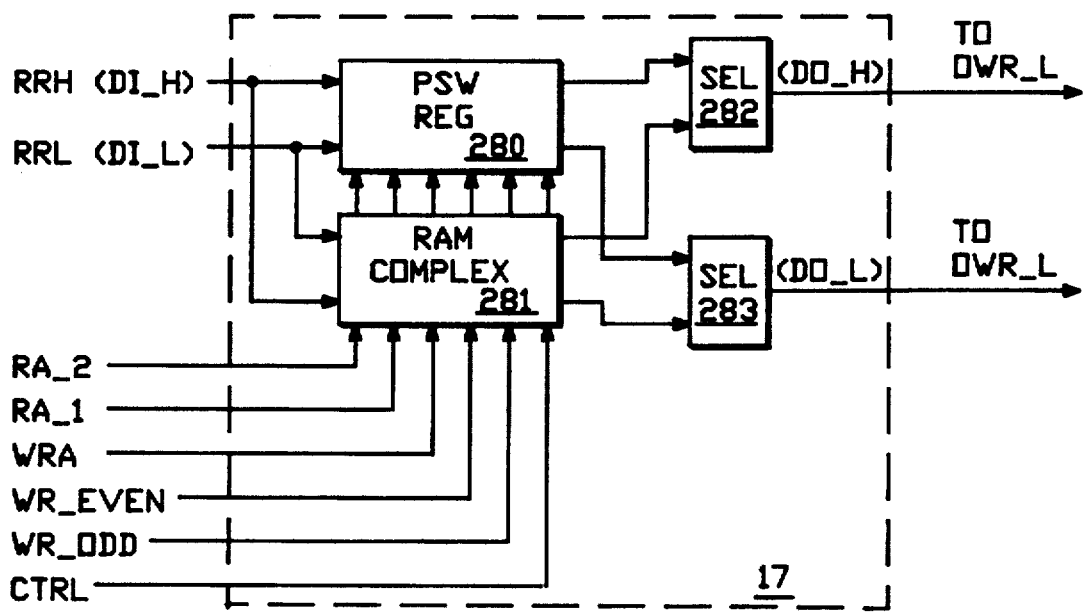
FIG.—6
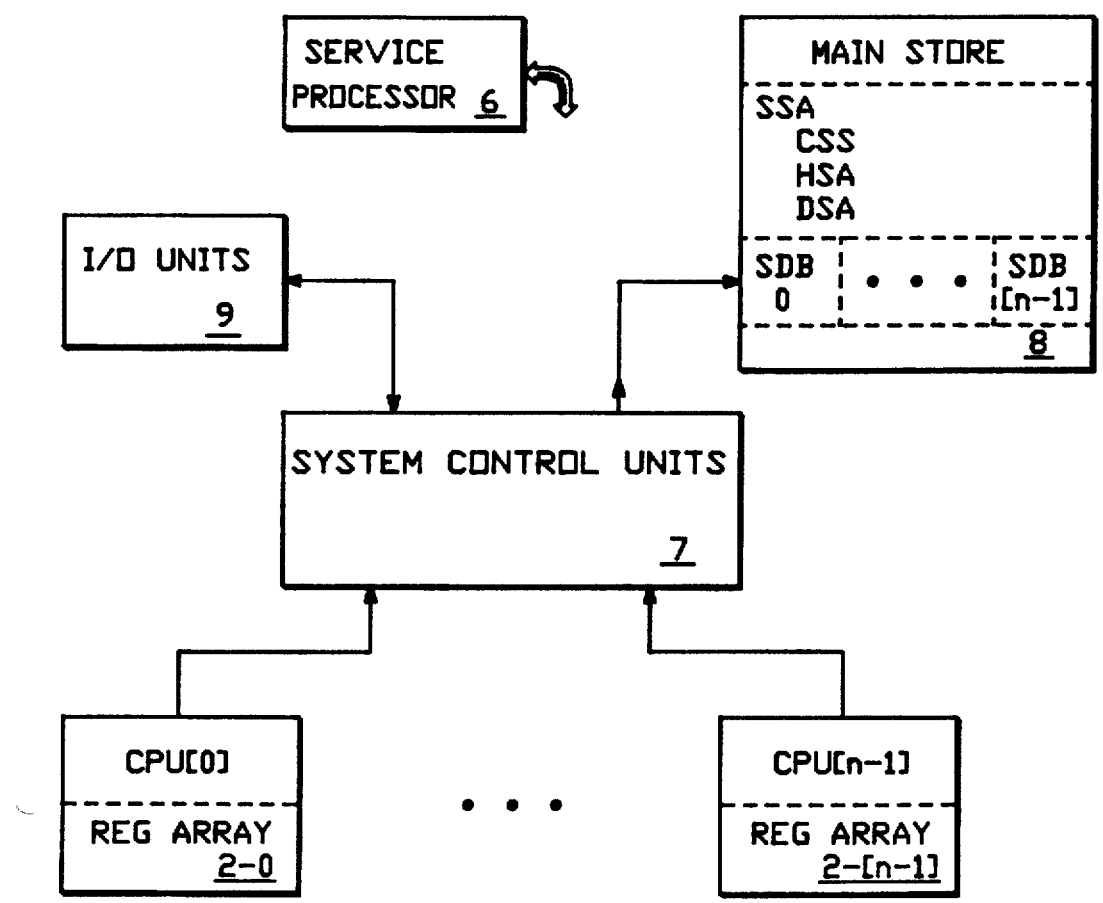
FIG.—7

DOMAIN INTERLOCK

BACKGROUND OF THE INVENTION

The present invention relates to the field of computers having central processing units (CPU's) that operate in accordance with the IBM ESA/390 architecture and particularly to computers that require synchronization.

Computer architectures, such as the IBM ESA/390 architecture, define a unit of operation (UO) that is used to control the instants when an interruption can be examined and serviced. Interruptions can occur at any point in time; however, they are only examined and serviced during the interrupt processing time (IPT) between the end of one unit of operation and the start of the next unit of operation.

TABLE A depicts the relationship between units of operation and instruction processing time.

TABLE A

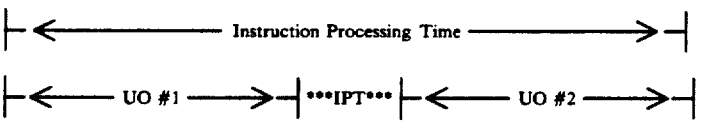

Most instructions consist of only one unit of operation. However, long and more complex or repetitive instructions such as MOVE LONG, COMPARE LOGICAL LONG, TEST BLOCK and UPDATE TREE consist of many units of operation.

The unit of operation is needed in large computer systems because of the need for having a reasonable response time for interruptions while avoiding complex instruction processing units. If the interruptions have to be taken at any point in time during the instruction processing time, then the CPU design will be considerably more complex than if the interruptions are only taken at the end of instruction processing time.

ESA/390 architecture computers are controlled in part by a Program Status Word (PSW). The program-status word (PSW) includes the instruction address, condition code, and other information used to control instruction sequencing and to determine the state of the computer. The active or controlling PSW is called the current PSW. It governs the program currently being executed.

The CPU has an interruption capability, which permits the CPU to switch rapidly to another program in response to exception conditions and external stimuli. When an interruption occurs, the CPU places the current PSW in an assigned storage location, called the old-PSW location, for the particular class of interruption. The CPU fetches a new PSW from a second assigned storage location. This new PSW determines the next program to be executed. When it has finished processing the interruption, the interrupting program may reload the old PSW, making it again the current PSW, so that the interrupted program can continue.

The status of the CPU can be changed by loading a new PSW or part of a PSW. Control is switched during an interruption of the CPU by storing the current PSW, so as to preserve the status of the CPU, and then loading a new PSW.

A new or modified PSW becomes active (that is, the information introduced into the current PSW assumes control over the CPU) when the interruption or the execution of an instruction that changes the PSW is completed.

A storage key is associated with each 4K-byte block of storage that is available in the configuration. The storage key has the following format.

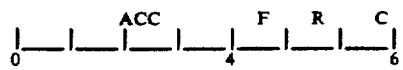

The bit positions in the storage key are allocated as follows:

Access-Control Bits (ACC)

If a reference is subject to key-controlled protection, the four access-control bits, bits 0-3, are matched with the four-bit access key when information is stored, or when information is fetched from a location that is protected against fetching.

Fetch-Protection Bit (F)

If a reference is subject to key-controlled protection, the fetch protection bit, bit 4, controls whether key-controlled protection applies to fetch-type references and that fetching with any access key is permitted; a one indicates that key-controlled protection applied to both fetching and storing. No distinction is made between the fetching of instructions and of operands.

Reference Bit (R)

The reference bit, bit 5 normally is set to one each time a location in the corresponding storage block is referred to either for storing or for fetching of information.

Change bit (C)

The change bit, bit 6, is set to one each time information is stored at a location in the corresponding storage block.

Protection

Protection facilities are provided to protect the contents of main storage from destruction or misuse by programs that contain errors or are unauthorized. Key-controlled protection, access-list-controlled protection, page protection, and low-address protection are forms of protection available in ESA/390.

Key-Controlled Protection

When key-controlled protection applies to a storage access, a store is permitted only when the storage key matches the access key associated with the request for storage access; a fetch is permitted when the keys match or when the fetch-protection bit of the storage key is zero.

The keys are said to match when the four access-control bits of the storage key are equal to the access key, or when the access key is zero.

Fetch-Protection-Override Control

Bit 6 of control register 0 is the fetch-protection-override control. When the bit is one, fetch protection is ignored for locations at effective addresses 0-2047. An effective address is the address which exists before any transformation by dynamic address translation or prefixing. However, fetch protection is not ignored if the effective address is subject to dynamic address translation and the private-space control, bit 23, is one in the segment-table designation used in the translation.

Fetch protection override has no effect on accesses which are not subject to key-controlled protected.

Access-List-Controlled Protection

In the access-register mode, bit 6 of the access-list entry, the fetch-only bit, controls which types of operand references are permitted to the address space specified by the access-list entry. When the entry is used in the access-register-translation part of a reference and bit 6 is zero, both fetch-type and store-type references are permitted, and an attempt to store causes a protection exception to be recognized and the execution of the instruction to be suppressed.

Page Protection

The page-protection facility controls access to virtual storage by using the page-protection bit in each page-table entry. It provides protection against improper storing.

One of the instructions that is able to modify part of a PSW is the Set PSW Key From Address (SPKA) instruction. The ESA/390 architecture requires the SPKA instruction to load the architecturally defined PSW "access key" from four bits extracted from the effective address of the SPKA instruction. The access key is used to limit the access of future instructions to certain storage areas to aid in providing protection and privacy of information.

In the problem state, the execution of the SPKA instruction is subject to control by the PSW-key mask in control register 3. When the bit in the PSW-key mask corresponding to the PSW-key value is set is one, the SPKA instruction is executed successfully. When the selected bit in the PSW-key mask is zero, a privileged-operation exception is recognized. In the supervisor state, any value for the PSW key is valid. During execution of the SPKA instruction, the Condition Code remains unchanged.

The format of the SPKA instruction permits the program to set the PSW key either from the general register designated by the B2 field or from the D2 field in the instruction itself.

When one program requests another program to access a location designated by the requesting program, the SPKA instruction can be used by the called program to verify that the requesting program is authorized to make this access, provided the storage location of the called program is not protected against fetching. The called program can perform the verification by replacing the PSW key with the requesting-program PSW key before making the access and subsequently restoring the called-program PSW key to its original value. Caution must be exercised, however, in handling any resulting protection exceptions since such exceptions may cause the operation to be terminated.

One well-known computer operating with the IBM ESA/390 architecture is the Amdahl 5995-A computer. In that computer, the I-Unit pipeline is a six stage pipeline consisting of stages D, A, T, B, X, and W that process instructions.

One of the functions of the D stage is to collate the necessary information to reference storage in the A, T, and B stages. This D-stage function includes the generation of the effective address and selection of the access key to be used by the reference. The A, T, and B stages fetch operands/data using the current valid key that is defined by the architecture, PSW KEY$_A$.

One of the functions of the W (write) stage is to write results of operations to architecturally defined registers or storage. The W stage in the pipeline comes after the fetch-operands/data stages (A, T, and B) and the arithmetic functions stage (X). The access key used is the key, PSW KEY$_A$, from the architecturally defined PSW register. After the access key in the PSW has been updated in the W stage, the new key, PSW$_N$, is available for future operations/instructions and the ne key becomes the architecturally defined key, PSW KEY$_A$. The ESA/390 architecture requires that the new key be effective starting from the instruction immediately following the SPKA instruction. The new PSW key can be used in a subsequent D segment while being updated in the W segment.

The fetching of any instruction following a SPKA instruction is subject to key fetch protections and hence must wait until the SPKA instruction has updated the key in the PSW register.

If a storage-reference instruction (an instruction that references storage) immediately follows a SPKA instruction, the fetching of data by that storage-reference instruction must wait until after the SPKA instruction has updated the access key in the PSW register, that is, must wait until the architecturally defined key, PSW KEY$_A$, has been updated with the new value, PSW$_N$ from the SPKA instruction.

In a pipelined processor as described, it is possible for an instruction flow to update an architected quantity and for a subsequent flow which accesses buffer storage to attempt to begin execution before the first flow completes. If allowed to proceed, this subsequent flow will generate a buffer access subject to invalid controls, resulting in erroneous generation of results.

This situation is described graphically below:

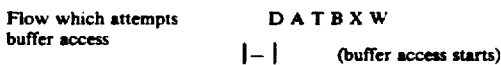

This situation is usually avoided by architecting any instructions which can potentially update control quantities to cause a pipeline serialization function which will discard any subsequent instructions already started and re-fetch and execute them once the control quantities become valid.

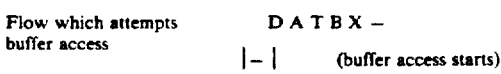

-continued

Restart buffer access

D A T B X W

|—| (buffer access starts)

In computer systems, a system control program (SCP) is responsible for resource management and often uses architectural registers. Computer systems under control of the control program operate in User State and in Control State. In User State, user programs and vendor-provided operating systems execute. IBM system control programs (CP's) run in User State. Certain instructions and facilities of User State may be emulated by Control State software.

Control State is for controlling system resources and they may be shared by multiple domains and provide emulation when necessary. Emulation may be used for enhancing the IBM ESA/390 architecture or may be used so that User State programs that run on one manufacturer's machines having one set of hardware may run on another manufacturer's machines with different hardware. Control State operation is based on the IBM ESA/390 architecture. Entry to Control State from User State is vectored, invoked by Control Interceptions that require assistance by Control State software.

Transitions from User State to Control State occur under a number of conditions. For example, a transition may occur when an instruction, occurs that is defined as an emulated instruction when an instruction occurs for which a specific interception control is set, when an interruption occurs for which a specific interception control is set, or when an interruption occurs that is defined as a mandatory Control Interception.

The SCP in some environments operates the machine hardware and multiplexes the physical resources of the computing system into multiple logical entities called virtual machines, each of which is a simulation of a computer dedicated to the servicing of a single user or (in the case of a server) a single application. Virtual machines are software entities that can be easily configured to running a particular program rather than to a user. A virtual machine configured in this manner is referred to as a virtual machine server. By virtualizing, operating systems can link guest systems together without the need for guest-specific actual hardware. Also, operating systems allow multiple guest systems to share devices and other resources to simplify configuration and maintenance.

Resource management (SCP) and user management (CMS) are seperate. When a CMS user logs on to the system, the SCP (system control program) creates a virtual machine for that user that includes, among other things, storage address space. An address space is a sequence of addresses that starts at one address and extends up to a value that varies according to size. Storage management is an important task of the supervisor or host which must create, share, and otherwise manage address spaces, gain and relinquish access to an address spaces, and map data on external devices.

Virtual machines running in the ESA/390 architecture have at least one address space, the primary address space, given to the user by the SCP when the user logs on to the system. The size of this address space is determined from the entry describing that user in the user directory, or from a subsequent DEFINE STORAGE command. After logging on, if authorized in the user directory, a user may create other address spaces and share them with other logged-on users.

Before a program can actually read or write data in a nonprimary address space, it must invoke an SCP service to add an entry designating that address space to its access list Each virtual configuration has its own access list having entries that determine which address spaces the virtual CPUs in that configuration can reference at any one time. The number of entries in the access list is controlled by information in the user's directory entry.

When a program adds an address space to its access list, SCP selects an unused entry in the access list, fills it in as requested by the program, and returns a four-byte access-list-entry token (ALET) to the program. A program uses this ALET to make direct references to the address space. The access-list entry thus allocated remains allocated until the program explicitly removes the entry, or until the virtual machine goes through a virtual-machine-reset operation.

Interpretive-Execution

The IBM Interpretive Execution Facility (IEF) allows a computer system running under a host System Control Program (SCP) to interpret a virtual machine called the guest. The term "host" refers to the real machine together with the SCP running on the real machine. The host manages real-machine resources and provides services to the guest programs which execute in an interpreted machine. The interpreted and host machines execute guest and host programs, respectively. For a transfer of control from a guest virtual machine back to its host System Control Program (SCP), an "interception" occurs.

In the existing computer architecture, when a guest issues a START INTERPRETIVE EXECUTION (SIE) instruction, the instruction is intercepted and emulated by the host program at a significant performançe cost. Through emulation, the host provides the functions of a selected architecture which may be available on some other real machine or which may be available only in the virtual-machine environment. Privileged and problem-program instruction execution, address translation, interruption handling, timing and other functions are interpreted so that those functions are executed in the context of the virtual machine. With the addition of special-purpose hardware, interpreted execution can approach speeds that are comparable to native-mode execution, that is, execution by a non-interpritive version of the architecture.

In the virtual-machine environment, the guest program has access to all the functions defined for the designated architecture either through an interpretive-execution facility or by the host system control program. For VM/ESA, the control program CP provides functions through simulation. Simulation generally executes guest functions transparently so that the guest program is unaware as to whether a function is performed by the machine or the host except that simulation usually requires more time.

When an SIE instruction is executed, the operand of the SIE instruction containing the State Description is fetched to obtain information about the current state of the guest. When execution of SIE ends, information representing the state of the guest, including the guest program status word (PSW), is saved in the state description before control is returned to the host. The information in the state description, as used and modified by the host during simulation, allows the guest to start and stop execution with valid information. The state description also determines the mode and other environmental conditions in which the guest is to execute.

While in interpretive-execution mode the host, in order to be protected from interference by guests or interferance among guests, allocates portions of the real-machine resources to the virtual machine. Guest storage is confined to a portion of host real storage or to host virtual address spaces controlled by the host system. Host enabled and disabled states generally are undisturbed by execution of the guest. A complete and logically separate set of control registers is maintained by the machine for use by the host and another set for each guest is maintained for use by the guest. Other registers are shared between the host and guests.

In some oases, the host intercepts operations normally performed by the machine. The state description includes control bits settable by the host to cause intercept operations under specific condition. When the specific condition are met, the machine returns control to host simulation. Intervention controls capture the introduction of an enabled state into the PSW, so that the host can present a interruption which it holds pending for the guest. Intervention controls may be set asynchronously by the host on another real processor while interpretation proceeds. The machine periodically refetches the controls from storage, so that updated values will be recognized. Guest interruptions can thereby be made pending without prematurely disturbing interpretation.

Guest Storage

Preferred-storage mode and pageable-storage mode are provided for in the interpretive-execution architecture. In preferred-storage mode, a contiguous block of host absolute storage is assigned to the guest and in pageable-storage mode, dynamic address translation (DAT) at the host level is used to map guest main storage. In preferred-storage mode, the lower addresses of the machine storage are dedicated to the guest and only one guest can obtain production mode performance.

In the pageable-storage mode, the host has the ability to scatter the real storage of pageable-storage-mode guests to usable frames anywhere in host real storage by using the host DAT, and to page guest data out to auxiliary storage. This method provides flexibility when allocating real-machine resources while preserving the expected appearance of a contiguous range of absolute storage for the guest.

A virtual-machine environment may require DAT twice, once at guest level, to translate a guest virtual address into a guest real address, and then, for a pageable guest, at the host level, to translate the corresponding host virtual address to a host real address.

Multiple High-performance Guests

The Multiple Domain Facility ™ (MDF ™) available on Amdahl computers provided concurrent execution of two or more operating systems with high performance on a single shared central computing complex. Such operation permits the reassignment of resources dynamically with minimal performance penalty for a variety of different architectures or systems.

While large computer systems have used the Unit Of Operation (UOP) to obtain a reasonable response time for interruptions while avoiding overly complex instruction processing units, the operations have not been fully adequate during emulation and virtual machine operations. During such operations, the real time measurements of the UO for the operation in the real host environment do not map exactly to the emulated time operations and operations in different domains.

In typical computer systems, storage accesses are normally to System Storage. Control State Software (CSSW) has the capability to access Domain storage by setting architected controls and using base registers in the range 2 through 7. Normally, execution in Control State of any instruction which can modify architected controls that can affect system storage accesses will cause a pipeline serialization to insure correct operation of the pipeline.

Execution of instructions in control state which can modify architected controls that can affect Domain storage accesses, do not cause pipeline serialization, because the default mode is to access system storage from Control State. Such serialization would normally be unnecessary. If such an instruction is executed and is followed by another instruction that can generate a Domain storage access, and if no serialization is performed by the first instruction, Domain storage will be accessed subject to invalid controls as described earlier.

In the prior art, this case was handled by simply specifying to the CSSW programmer that code should be written such that no Domain storage accesses be attempted for "n" cycles following any instruction which can modify architected Domain storage controls, where "n" was a number large enough to guarantee correct operation of the pipeline for such oases. However, programmers are not always careful in complying with the limitations and furthermore they were a burden.

Accordingly, there is a need for a computer system having improvements in the control operations.

SUMMARY OF THE INVENTION

This disclosure describes a pipeline interlock mechanism which insures the logical integrity of architected control quantities when used to access Domain Storage from Control State.

A hardware Domain Interlock (DOMI)is provided to detect the start of execution in Control State of any instruction which modifies architected controls governing the access of Domain storage and which insures that any subsequent potential access to Domain storage remains interlocked in the D-cycle until the modified controls become valid.

Any instruction flow that updates any architected control quantity which affects the accessing of Domain Storage is decoded in its D-cycle and the decode point is staged with the flow performing the update to the W-cycle. This decode point is called "DOMI Pending" and, as implemented, there are A-, T-, B-, X-, and W-cycle staging points for the decode. Every instruction flow which updates one of these controls will set the DOMI Pending staging platform so that instructions which modify multiple registers with multiple flows are covered as well as instructions which update a single register with a single flow.

In the D-cycle, any instruction specifying a base register in the range 2 through 7, or specifying an explicit access to Domain storage, is decoded. If any of the A- through W-cycle DOMI Pending staging points is set, indicating that an update to an architected quantity that could affect the Domain access is still in progress, the D-cycle is interlocked and will remain so until all of the DOMI Pending staging points are reset, indicating that all pending updates have completed. At that point, the Domain access is allowed to proceed to the A-cycle.

In a computer with the present invention, the CSSW programmer need not be concerned with the number of cycles to allow between a control update and a Domain storage access in the code in order to insure correct operation of Domain storage accesses from Control State. Additionally, no minimum number of pipeline interlocks is required so that flows that are not actually necessary are avoided, thereby upgrading overall performance.

This domain interlock insures correct operation with a minimum possible delay in the pipeline sequence and is entirely transparent to the CSSW programmer. CSSW code can be written with the assurance that correct operation will result regardless of temporal alignment of update and Domain access instruction flows, while code maintenance and machine debug are greatly enhanced.

The foregoing and other objects, features and advantages of the invention will be apparent from the following detailed description in conjunction with the drawings.

BRIEF DESCRIPTION OF THE DRAWINGS

FIG. 1 depicts an overall block diagram of a computer system incorporating the present invention.

FIGS. 2, 3 and 4 depict detailed block diagrams of the FIG. 1 system.

FIGS. 5A and 5B depict a block diagram of the I-Fetch data and control circuitry that forms part of the FIG. 1 system.

FIG. 6 depicts a detailed block diagram of the register array complex.

FIG. 7 depicts a block diagram of a multiple CPU system using multiple CPUs of the FIG. 1 type.

DESCRIPTION OF THE PREFERRED EMBODIMENTS

Overall Computer System—FIG. 1

Figure 2:
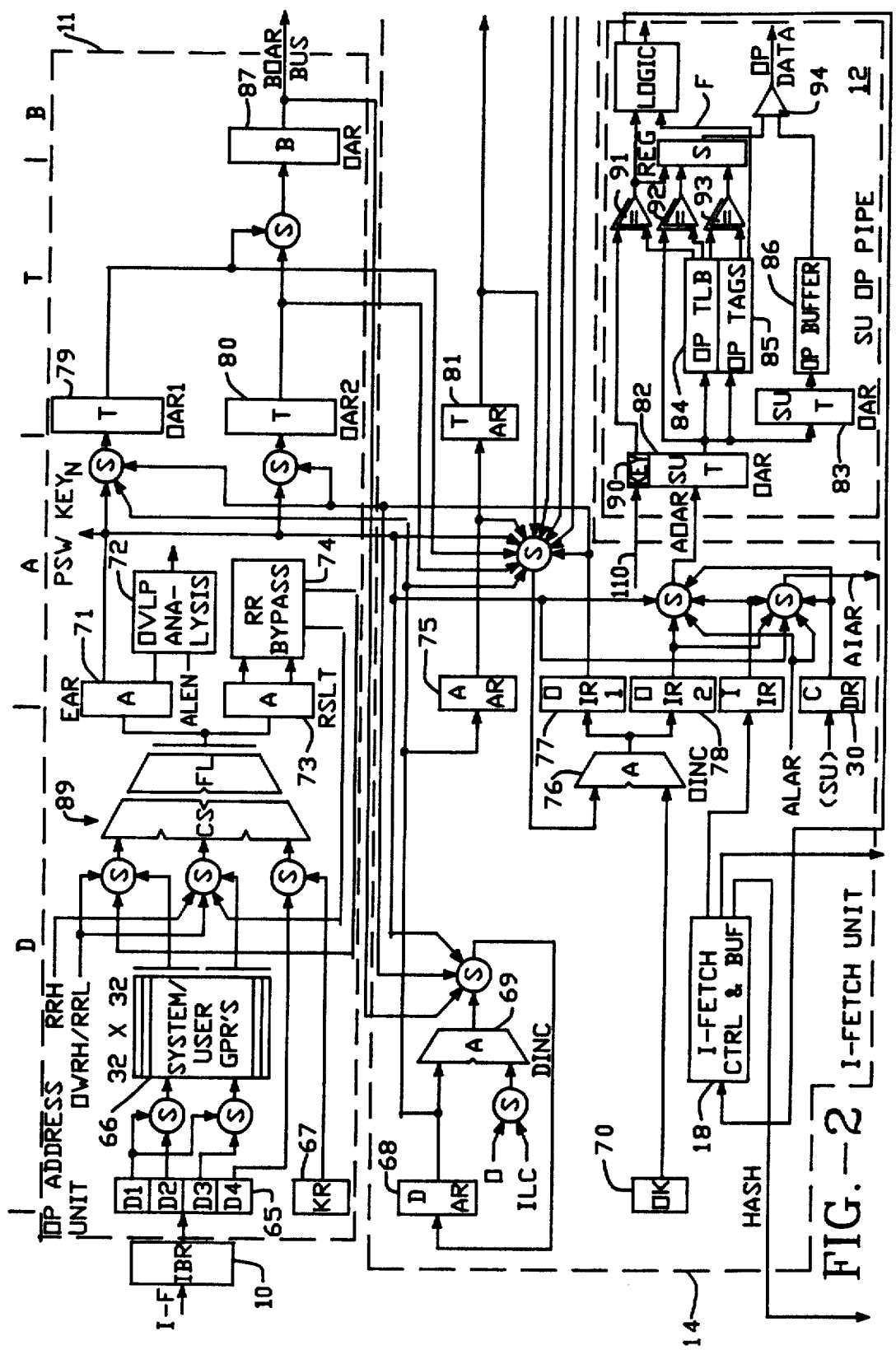

In FIG. 1, a computer system compatible with the Amdahl 5995-A computer operating in accordance with the ESA/390 architecture is shown. The computer system of FIG. 1 includes an instruction unit (I-unit) 5, a storage unit (S-Unit) 4, an execution unit (E-Unit) 13, system control units 7, I/O units 9, main store 8, and a service processor 6. The instruction unit 5 includes an operand address unit 11, an instruction data register 65, an I-fetch unit 14, a register array 17, and an I-unit control 3. The storage unit 4 includes an SU Op Pipe 12 and an SU I-Fetch Pipe 15

The FIG. 1 system features two machine states, User State and Control State. In User State, supersets of the IBM ESA/390 architecture are supported. Some User State operations may be emulated by Control State software. The architecture provides support for Control State Software to implement the "Multiple Domain Facility" (MDF). MDF provides for multiple computing systems to exist in User State on one processor complex. This operation is accomplished by providing each virtual computing system (domain) with its own private main storage, channels, operator console, and optionally expanded storage, while multiplexing all domains on the CPU resources available to the processor complex.

A "Domain" is a set of resources such as CPU's, main storage and channels available to a User State control program(CP). A domain program is a User State program. A domain consists of both domain-native and guest resources. The terms "User", "User State", and "LP (Logical Processor)" also refer to both domain-native and guest resources, although LP usually is used to refer to a domain CPU.

A "Guest" is a resource that requires the presence of a supporting 'host' domain control program. A guest program is one that runs in an environment consisting of a specific set of guest resources. When a CPU operates in guest mode (User State or Control State), domain resources accessed by a program are guest resources (for example, guest PSW) by default. In guest mode, access to other resources is under program control which is sometimes called interpretive-execution mode. Domain Mode Control <A> indicates whether a CPU operates in guest mode or not.

"Domain-native" is a resource that does not require the presence of a domain control program. A domain-native program is one that runs in an environment consisting of domain-native resources. A CPU is in domain-native mode if it is not in guest mode; in this mode, domain resources accessed by a program are domain-native resources (for example, domain-native PSW) by default. In Control State, access to other resources is under program control.

A "Host" is a domain program that supports guest resources. The term "host" is meaningful when discussed in the context of a guest. Host resources may behave differently when the CPU is in guest mode. The term "host mode" may sometimes be used interchangeably with "domain-native" mode.

User programs and vendor-provided operating systems run in User State. IBM SCPs run in User State. User State may be in either System/370 or ESA/390 mode. Certain instructions and facilities of User State may be emulated by Control State software.

Control State is for controlling system resources which may be shared by multiple domains and may provide emulation. Emulation is often used for enhancing the IBM ESA/390 architecture or for enabling User State programs that run on one manufacturer's machines to run on another manufacturer's machines. Control State operation is based on the IBM ESA/390 architecture. Entry to Control State from User State is vectored, invoked by Control Interceptions that require assistance by Control State software.

Transitions between User State and Control State occur under a number of conditions. For example, transitions occur when an instruction occurs that is defined as an emulated instruction, when an instruction occurs for which a specific interception control is set, when an interruption occurs for which a specific interception control is set, and when an interruption occurs that is defined as a mandatory Control Interception.

In the FIG. 1 system, there are two types of units of operation, the domain unit of operation (DUO) and the machine unit of operation (MUO).

In the FIG. 1 system, the System Communication Interface (SYSCOM) provides a means of communication among Control State software and various processing units within a system. These processing units include I/O Processors (IOPs), service processors (SVPs), and CPUs. The means of communication is through passing data in control blocks in the HSA, and informing the recipient via a signaling mechanism.

In FIG. 1, the service processor (SVP) 6 is provided to assist in configuration of the system, machine check handling, operator facilities, and other model-dependent functions.

The FIG. 1 system includes a facility to permit asynchronous communication between TCMPs using messages. The message processing facility and the instructions to support them are collectively known as the TCMP unification facility (TUF). TUF is distinguished from a local area network. The TUF assembles large single system images by linking TCMPs. The resulting complexes are used for transaction processing in large enterprises.

In the FIG. 1 system, the architectural register sets are defined as follows access registers (AR), floating point registers (FR), general registers (GR), Control State and domain AR MAP registers (MR), register array (RA), and vector registers (VR). Other individual registers, such as the program status word (PSW), are also defined.

Using the GR as an example, the following notation is used to identify subsets of a register set. To specify register x of the set of GRs, the notation GRx is used if x is a number; the notation GR(x) is used if x is a variable (for example, GR(R1) means the general register designated by the R1 operand).

To specify the consecutive bit positions beginning with w and ending with z, the notation <w:z> is used. A string of bits is specified by listing the bits, separated by commas as in <x, w:z, ... >. To specify bit string y of register x of the set of GRs, the notation GRx<y> or GR(x)<y> is used. Bit string y may consist of only 1 bit. To specify bit string y within field F 77 of register x of the set of GRs, the notation GRx.F<y> or GR(x).F<y> is used. Bit string y may consist of only 1 bit. Bit positions given for y are with respect to the field F (for example, DAC.DABR—ctl<O> \ &).

In the FIG. 1 system, the various architectural registers are implemented in a register array. The registers in the register array are set forth in the following TABLE 1.

TABLE 1

| RA NOs. | CPU Register Array |
|---|---|
| 0X | Control State General Registers |
| 1X | Control State Parameters |
| 2X | DAC/CI Parameters/Control State VBPA |
| 3X | Control State AR MAP Registers |
| 4X | Domain-Native General Registers |
| 5X | Domain Counters/Domain Parameters |
| 6X | Domain Parameters/Domain VBPA |
| 7X | Domain AR MAP Registers |
| 8X | Domain-Native Control Registers |
| 9X | Domain Parameters |
| AX | reserved |
| BX | reserved |
| CX | Guest Control Registers |
| DX | Guest Parameters |
| EX | Guest Parameters |
| FX | Reserved for Control State Software |

In FIG. 1, the main Store 8 contains a system storage area where Control State software and the Hardware System Area (HSA) reside, and domain storage area(s), one for each domain. Each storage area is a separate address space, or address dimension, that is, for example, up to 2 GB in size. Mapping of these address spaces to physical main storage is via blocks of storage that are 2 MB or larger.

"Expanded Storage". Control State software and domains may each optionally have its own expanded storage. Mapping of Control State or domain expanded storage areas to physical expanded storage is similar to main storage mapping.

"Shared Global Storage". The architecture can support a large single system image that is composed of multiple tightly coupled (i.e., shared main memory) multiprocessors (TCMP). Shared Global storage (SGS) permits data to be shared between TCMPs by functionally connecting the SGS to the main storage of each of the TCMPs. A domain in a TCMP can share all or a portion of SGS with a domain in another TCMP. Mapping of domain SGS to physical SGS is similar to the expanded storage and main storage mapping.

In the FIG. 1 system, the register array (RA) Complex 17 includes 256 word registers that are under control of Control State instructions. A specific RA register is identified by an 8-bit operand field in these instructions. Defined RA registers have two identifications: the functional name (for example GR0) and their register offset in the register array (for example RA(C0)). In addition to using one of the RA-manipulation instructions, some RA registers can be accessed directly by unique instructions that manipulate the functional registers (for example domain CRs can be loaded using the LCTL instruction). For such registers, there may be a preference in the means of access. For example, loading the RA copy of the system prefix has no effect on prefixing; the SPX instruction should be used. Note that the RA registers are not necessarily changed by an instruction addressing the register; some (for example the User State Old PSWs) can be changed due to an interruption or CI. The RA contains most architecturally-defined registers and controls, including Control State prefix, domain-native prefix, guest prefix, DAC, feature control bits, general and control registers.

The architectural registers that are not in the same physical register array are listed as follows:

The Control State PSW is not in the RA. The host PSW to be saved in the interpretive-execution mode is also not maintained in the RA; it is saved in the LPSD. (Note that although the domain-native and guest PSWs are provided in the RA for CSSW to inspect and modify, the instruction-address field (bits 33:63) is invalid).

The host GRs 14 and 15 defined to be saved in the interpretive-execution mode are not maintained in the RA; they are saved in the LPSD. (Note that the User State and Control State GRs are in the RA).

There is one set of FRs provided in User State, and they are not contained in the register array.

In FIG. 1, main storage 8 contains (1) a system storage area (SSA) where Control State Software (CSS) [both instructions and data] resides and where the Hardware System Area (HSA) resides, and (2) domain storage areas (DSA), one for each domain. Mapping of these address spaces to physical main storage is via blocks of storage that are, for example, 2 MB or larger. A domain's storage area is accessed using domain addresses. In User State, addresses are domain addresses of the current domain. In Control State, CPU generated addresses are generally system addresses However, under the control of the Domain Access Controls register, some operand effective addresses are treated as domain addresses.

In Control State, CSSW can select either User PSW<AS> and PSW<T> to determine the mode of accessing main storage, or it may choose to use another set of three bits to determine the mode of accessing main storage, which can be different from the current one, as specified by the user PSW.

Figure 3:
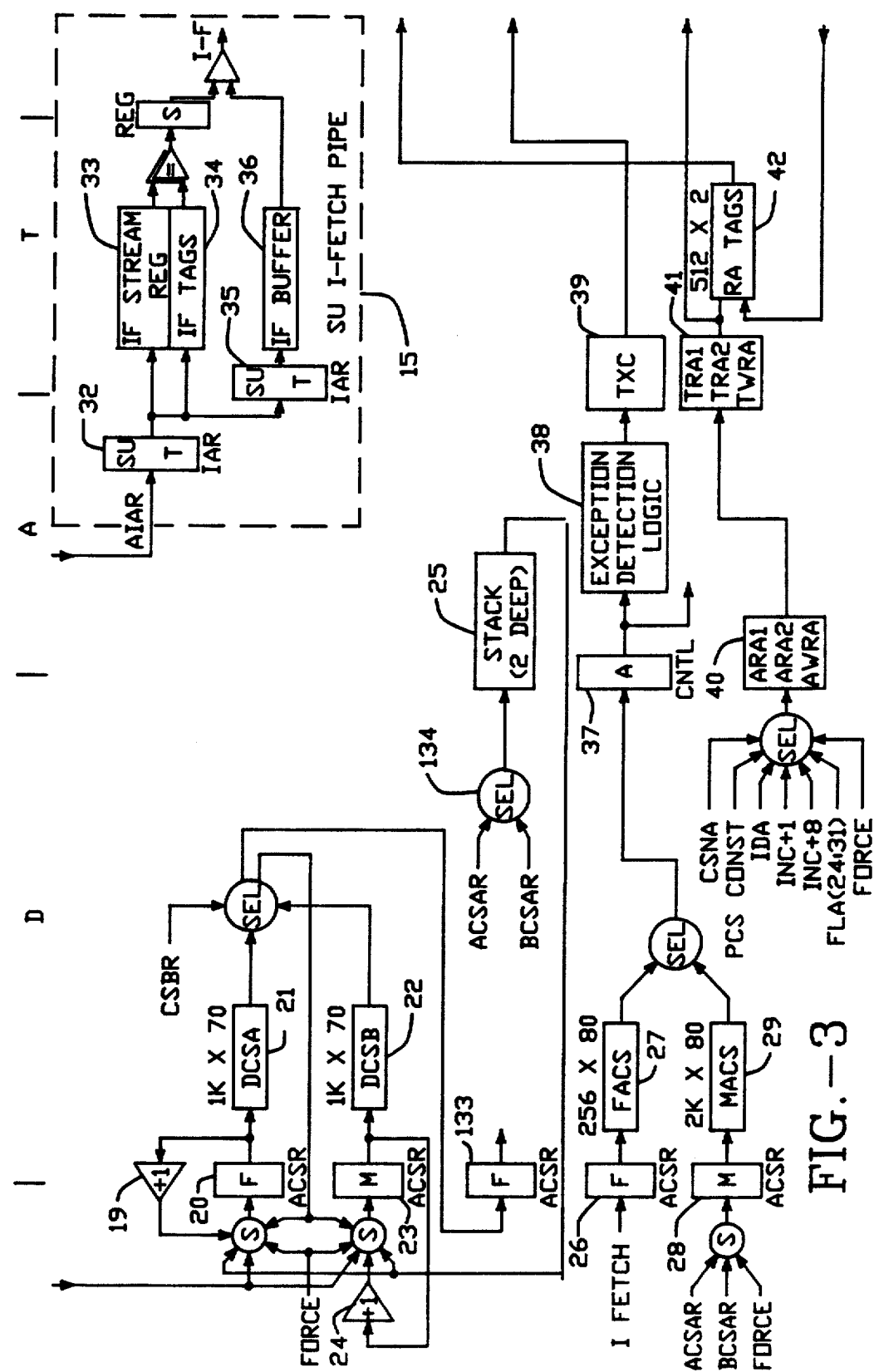

Detailed System—FIGS. 2, 3, 4

In FIGS. 2, 3 and 4, further details of the computer system of FIG. 1 are shown with an orientation as depicted in the lower right-hand corner of FIG. 1. The computer system operates in a pipelining fashion where operation is divided into a number of segments including P, A, T, B, R segments and D, A, T, B, X, and W segments. The units of FIGS. 2, 3, and 4 operate generally over the D, A, T, B, X, and W segments after a current instruction is loaded into the IDR register 65. To load an instruction, the P segment performs priority resolution, the A segment performs instruction address presentation, the T segment performs TLB lookup and cache tag matching, and the B segment loads the current instruction into the IDR register 65.

In FIG. 2, the I-Unit 5 fetches instructions into the instruction data register (IDR) 65 which are to be processed in a pipeline fashion. Up to six instructions, for example instruction $I_1$, $I_2$, $I_3$, $I_4$, $I_5$, and $I_6$ can be processing in the FIGS. 2, 3, and 4 units in the D, A, T, B, X, and W segments.

FIG. 2, the I-fetch unit 14 fetches instructions and stores them into the IDR 65 and delivers them to the storage unit Op Pipe 12 and the storage unit I-fetch pipe 15 to maintain a flow of instructions to be executed. The units of FIG. 2 cooperate with the register array 17 for controlling the flow of instructions and operands in the pipeline execution of the computer system.

The I-fetch unit 14 pre-fetches each instruction into the instruction data register IDR 65 so that when the D segment commences, the I-fetch unit 14 has finished for the current instruction, for example instruction $I_1$, and is pre-fetching subsequent instructions for example instructions $I_2$, $I_3$, $I_4$, $I_5$, $I_6$ and $I_7$. The I-fetch unit 14 during prefetching interacts with the storage unit 4 during the P, A, T, B, R segments that all precede the D, A, T, B, X, and W segments.

In FIG. 2, the IDR 65 provides information to the operand address unit 11. The operand address unit 11 determines addresses information to be processed by instructions. The addresses of operands are passed to the storage unit of operand pipe 12 which fetches the operands which are to be operated upon and delivers them to the execution unit 13. The execution unit 13 performs arithmetic and logical functions on the operands such as add, multiply, divide, move, or, and shift.

After prefetching, the D segment is the decode cycle for instruction decoding of the instruction in IDR register 65.

The A segment is address presentation for the S-unit 4. The T segment is a translation TLB lookup and cache tag match cycle. The TLB is a translation look-aside buffer. The B segment is the buffer cycle when, if a correct translation occurred in the TLB and if the line of data addressed is in the cache, the data is accessed and latched into the operand word register OWR (46, 49, 52). The X segment is for execution in the E-Unit 13 which takes data from the OWR, executes on the data and places the result in the result register (48, 51, 54). The W segment is for writing the results to the location specified by the instruction, for example, to an internal register in register array 17 or back to main storage 8.

Referring to FIGS. 2, 3, and 4 the instruction buffer register 10 is loaded by the I-fetch unit 14. The instruction buffer register 10 in turn loads the IDR register 65 in four fields, D1, D2, D3 and D4. The contents of the register 65 are selected to read the system or user general purpose registers 66 (GPRs). The contents of the general purpose registers are selected into the three-input adder 89.

After the SPKA instruction is latched into the IDR 65, the instruction address in the DAR register 68, valid in the D segment, is staged through the address registers in the A, T, B, X and W segments using the registers DAR 68, AAR 75, TAR 81, BAR 43, XAR 44, and WAR 45, respectively. In one alternate embodiment, the registers AAR 75, TAR 81, BAR 43 are eliminated and the equivalent information is obtained from other registers. Conceptually, however, these registers still exist even in the alternate embodiment.

Following the ESA/390 architecture, an operand storage address consists of three components, a base, an index and a displacement. The base, index and displacement values from GPR's 66 are added in adder 89 to form the effective address which is latched into the ARSLT and/or AEAR registers 73 and 71. The adder 89 forms the effective address and it is placed into the AEAR effective address register 71 and into the ARSLT result register 73. The contents of the effective address register 7 are present in the A segment and are used, among other things, as part of the access to the storage unit Op pipe 12 to obtain an operand from the storage unit. The contents are also stored into the T operand address registers 1 and 2, TOAR1 79 and TOAR2 80 in the T segment. The contents of one of the registers 79 or 80 are passed to the B segment operand address registers, BOAR 87. The storage unit Op pipe 12 includes a register 90 which is loaded with the PSW Key which is to be used for key protection checking when the storage unit is accessed. The key from the register 90 is compared in comparator 91 with a key from the OP TLB unit 84 to determine if a key match exits. The other portions of the TLB including the OP tags 85 and OP buffer 86 are also compared in comparator 92 to generate a TLB MATCH signal. If the key match from comparator 91 is not asserted, meaning that the key from register 91 does not match the key from the TLB unit, then the TLB match signal is not asserted meaning that a protection key violation has occurred. If the keys do match and all the other required matches are also present, the TLB match signal is asserted indicating that, among other things, no key protection violation has occurred.

If the instruction being processed is a SPKA instruction, for example, then the processing during the X segment will cause a new PSW including a new PSW Key$_N$ to be stored through the RR result registers 48, 51 and 54 to the register array complex 17. The PSW will be loaded directly into the register array 56 and also will be stored into the PSW Key shadow register 95. The PSW register 95 holds a duplicate copy of PSW Key stored in the register array 56.

Once the D-cycle of a SPKA instruction is complete, the effective address latched in the AEAR register 71 will be moved down the pipeline to provide a new PSW$_N$ in the W segment provided nothing prevents the new PSW$_N$ from being written.

Figure 5A:
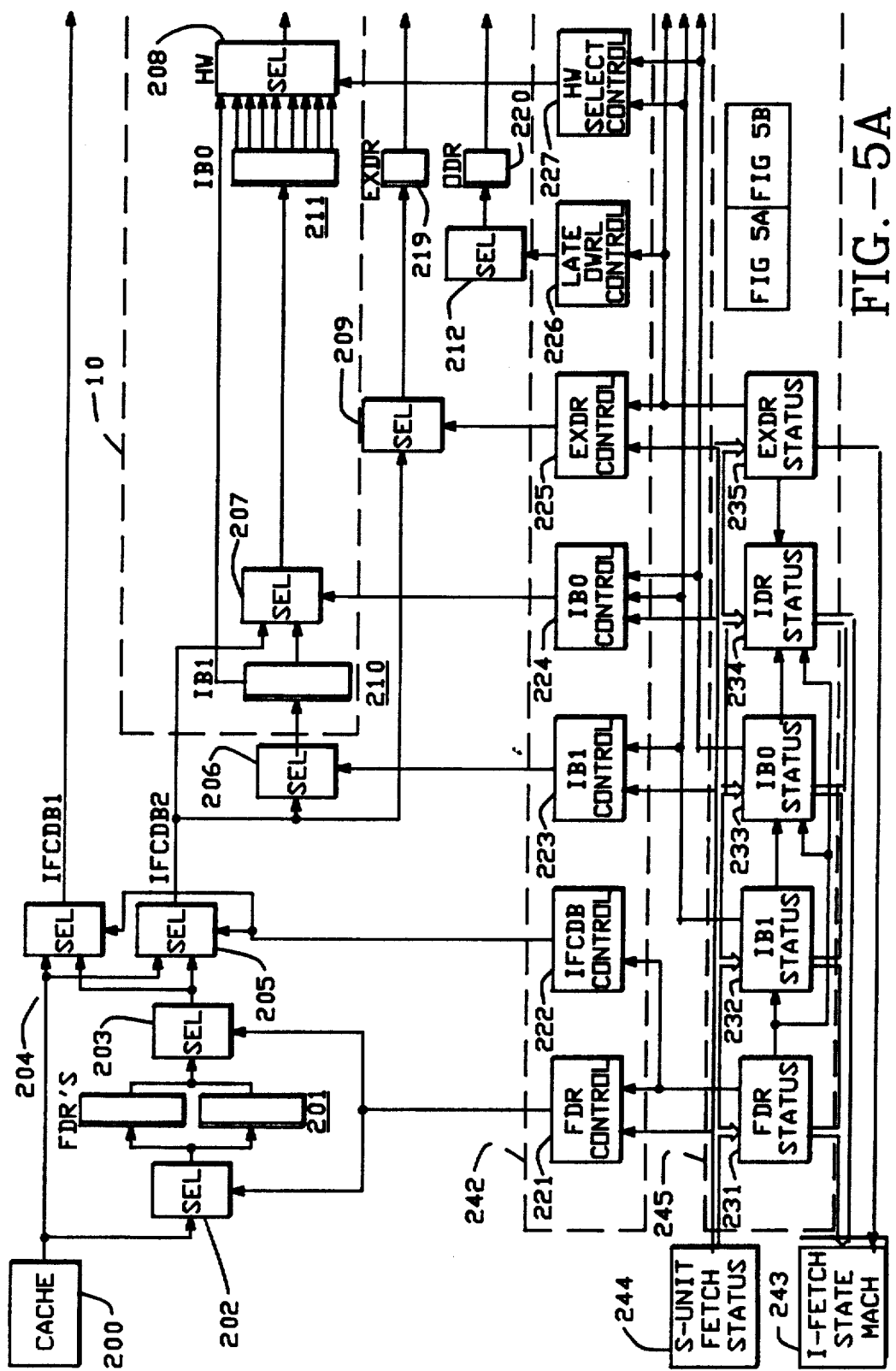

Instruction Fetch Platform—FIG. 5

In FIG. 5, further details of the I-Fetch Unit 14 of FIG. 1 are shown. In FIG. 5, the IDR Register 65 of FIG. 2 is expanded and is shown together with the circuitry for loading the IDR 65 with a sequence of instructions such as shown in TABLE A above.

In FIG. 5, the IDR 65 is loaded from the storage unit cache 200 or the FDR's 201. Selection of instructions into the FDR's 201 is under control of the selector 202 which in turn is controlled by the FDR control 221. Selection of instructions from the cache 200 or the FDR's 201 is under control of the selection gates 204 and 205 which in turn are controlled by the IFCDB control 222. Selection of instructions from the FDR's 20 is under control of the selection gate 203 which in turn is controlled by the FDR control 221. Selection gate 206 controls selection of the selected output of selector 205 into the IB buffer register 210. Selector 206 is under the control of the IB1 control 223. The selection from the buffer register IB1 or from the selector 205 is under control of the selector 207 which in turn is controlled by the IB0 control 224. The selected instruction selected by selector 207 is latched in the buffer register IB0 211. Selection of the contents of the IB0 register 211 by selector 208 is under control of the HW select control 227 and selector 208 in turn feeds the selector 213 which is under control of the IFDB control 228. The output from selector 213 or from the cache through selector 204 is under control of selector 214 which in turn is controlled by the IDR select control 229. The selected instruction from selector 214 is input to the IDR 65 which is staged through the IDR 65 stages IDR, AIDR, TIDR, BIDR, XIDR, WIDR, and ZIDR labeled 65-1, 65-2., 65-3, 65-4, 65-5, 65-6 and 65-7, respectively. The output from the ZIDR stage of the IDR 65 is selected by the selectors 237 and 238.

In FIG. 5, a decoder 270 decodes the instruction length code, ILC, from the instruction in the D-segment instruction data register (IDR). The ILC is latched into the AILC register 271 and staged to the TILC register 272 for the T-segment. The T-segment ILC, TILC, is added in adder 273 to the contents of the BNSIAR register 275 to form the next seqential instruction address (NSIA) which is stored back into the BNSIAR register 275. When a branch or other condition (BR) indicates that the next instruction in the sequence determined by adding the ILC to the current instruction is not the next instruction, the BNSIAR is loaded directly from the BOAR 87 of FIG. 2 under control of selector 274. The B-segment next sequential instruction address, BNSIA, is determined one instruction flow ahead of the current instruction in the pipeline. The BNSIA in the BNSIAR is a predict ⓡd value based on instruction length code.

In FIG. 5, control of the selection of which instructions to feed into the IDR register 65 is under the selection controls 221 through 229 in control unit 242. These controls receive status information from status unit 245 which is loaded by the S-unit Fetch Status 244. Status unit 245 also provides status to the IFETCH state machine 243. The S-unit Fetch Status 244 loads the FDR status 231, IB1 status 232, IB0 status 233, IDR status 234, EXDR status 235 and the BUBBLE UP STATUS 236 in the status unit 245. The different status and control conditions and related circuits for a main frame computer are extensive, and many of the details related thereto are not relevant to the present invention, but such details can be found, for example, in the Amdahl 5995-A computers. The particular control and status conditions which are relevant for selecting instructions in connection with the present invention will be described in detail hereinafter.

Register Array Complex—FIG. 6

In FIG. 6, further details of the register array complex 17 of FIG. 1 are shown. In FIG. 6, the ram complex 281 is like that shown in the above-identified cross-referenced application entitled MEMORY HAVING CONCURRENT READ AND WRITING FROM DIFFERENT ADDRESSES. The PSW register uses the same data in lines DI_H and DI_L which are the RRH and RRL lines, RRout, from the result register. Similarly, the read address lines RA_1 and RA_2, the write address lines WRA, the even and odd write strobes WR_EVE and WR_ODD, and the control lines CTRL are as shown in the cross-referenced application. The selectors 282 and 283 are like the selectors 24 and 25 in FIG. 3 of the cross-referenced application with the addition of the PSW inputs.

The RAM complex 17 can concurrently read and write to different addresses. As described in detail in the cross-referenced application, the RAM complex includes two RAMs, each having an address selector. The RAM complex includes a data out multiplexer for selecting outputs from one of the RAMs. The RAM complex includes a tag array storing an array of tag bits, one for each address in the RAMs. The tag bits are used to control the address selectors and multiplexer.

A single bit tag is provided in the tag array for each entry in the RAMs. The tag marks which one of the two RAMs has the valid data for the corresponding specific address. During a RAM read cycle, the tag routes the read address through the address selector for the correct one of the RAMs. The correct RAM is read using the read address and a staged copy of the tag controls the data out selector to select data from the correct RAM for the data out bus.

During a concurrent read and write cycle, the tag selects the read address for one RAM and selects the write address for the other RAM. A write enable signal, is provided for the write RAM. The tag for the write address is then updated in the tag array to point to the write RAM.

With the ability to read and write concurrently to different addresses, enhanced performance results by using only a single operation to concurrently read and write to the same address in the RAM complex.

Multiple CPU System—FIG. 7

In FIG. 7, a multiple CPU embodiment of the FIG. 1 system is shown. The FIG. 7 system includes a service processor 6, I/O Unit 9, a main store 8, system control unit 7 and a plurality of CPUs including CPU(0), CPU(n−1). Each of the CPUs includes a register array including the register arrays RA(0), . . . RA(n−1). The register arrays in each of the CPUs of FIG. 7 are like the register array complex 17 of FIG. 1 and of FIG. 6.

Each register array RA(0), . . . , RA(n−1) in the CPUs of FIG. 7 includes 256 word registers that are under control of Control State instructions. A specific RA register is identified by an 8-bit operand field in these instructions. Defined RA registers have two identifications: the functional name (for example GR0) and their register offset in the register array (for example RA(C0)). In addition to using one of the RA-manipulation instructions, some RA registers can be accessed directly by unique instructions that manipulate the functional registers (for example domain CRs can be loaded using the LCTL instruction). For such registers, there may be a preference in the means of access. For example, loading the RA copy of the system prefix has no effect on prefixing; the SPX instruction should be used. Note that the RA registers are not necessarily changed by an instruction addressing the register; some (for example the User State Old PSWs) can be changed due to an interruption or Control Interception (CI). Each RA contains architecturally-defined registers and controls, including Control State prefix, domain-native prefix, guest prefix, DAC, feature control bits, general and control registers.

The Control State PSW is stored in the PSW register in the RA complex as described in connection with FIG. 6. The host PSW to be saved in the interpretive-execution mode is saved in the storage data block (SDB) of main store 8. The host GRs 14 and 15 defined to be saved in the interpretive-execution mode are also saved in the SDB. The User State and Control State GRs are in the RAs.

In main storage 8, the system storage area (SSA) stores the Control State Software (CSS) [both instructions and data] and the Hardware System Area (HSA), and (2) domain storage areas (DSA), one for each domain. Mapping of these address spaces to physical main storage is via blocks of storage and a domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

In Control State, CSSW can select either User PSW<AS> and PSW<T> to determine the mode of accessing main storage, or it may choose to use another set of three bits to determine the mode of accessing main storage, which can be different from the current one, as specified by the user PSW.

Figure 8:
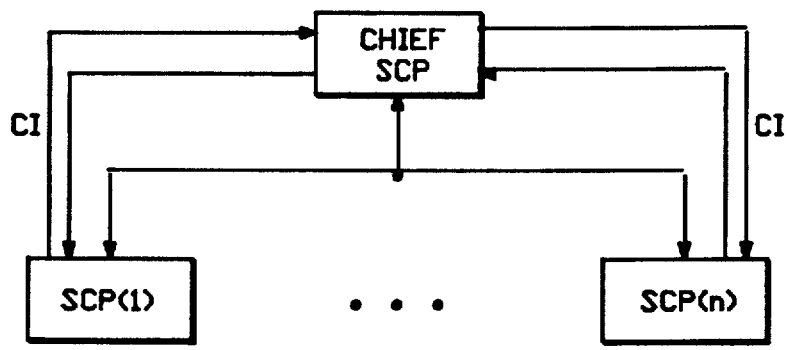
FIG. 8 depicts the relationship between a Chief SCP and standard SCPs such as MVS.
Figure 9:
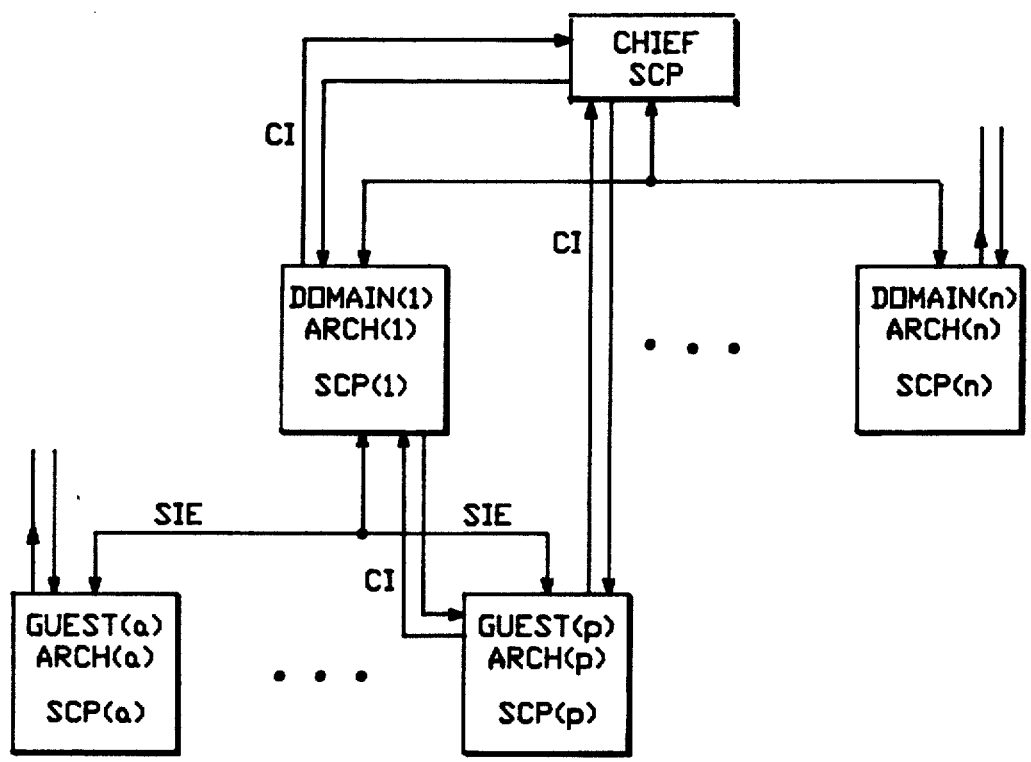
FIG. 9 depicts the relationship between the Chief SCP, first-level guests and second-level guests in the present invention.
Figure 10:
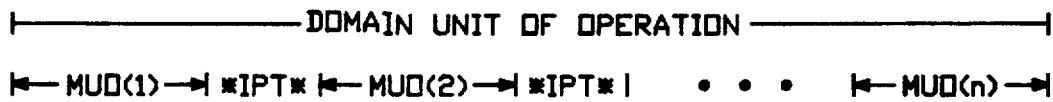
FIG. 10 depicts the relationship between the MUOs and a DUO in Control State.
Figure 11:
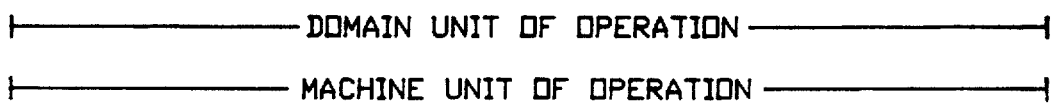
FIG. 11 depicts the relationship between a MUO and a DUO in Control State.

Control Programs (SCPs)—FIGS. 8 and 9 System

In FIG. 8, the relationship between a Chief SCP and a plurality of domain SPCs is indicated. The plurality of SPCs includes, for example, SCP(1), . . . , SCP(n). In normal operation, control can be transferred between the Chief and Domain SPCs by the Chief SCP with a Control Interception (CI).

In FIG. 8, all of the SPCs are first-level SPCs and one level of interception occurs between the Chief SCP and the Domain SCPs with Control Interceptions.

In FIG. 9, multiple levels of SCPs are provided. The first-level SPCs include the SCP(1), . . . , SCP(n) as in FIG. 8. Each SCP in the first-level SPCs may represent a different Domain having a different architecture. Specifically, the SCP(1), . . . , SCP(n) are in the domains Domain(1), . . . , Domain(n), having architectures Arch(1), . . . , Arch(n).

In FIG. 9, in addition to the first-level SPCs, a plurality of second-level SPCs exist, specifically SCP(a), . . . , SCP(p) which in turn are associated with Guest(a), . . . , Guest(p), and each having different architectures Arch(a), Arch(p), respectively. In FIG. 9, each of the second-level SPCs for the second-level Guests are associated with the first-level SCP(1). However, any of the other first-level SPCs may also spawn second-level Guests like shown for SCP(1).

In FIG. 9, any of the first-level SPCs can have a Control Interception by the Chief SCP. Similarly, any of the second-level SPCs can have a Control Interception to a first-level SCP. However, in accordance with the present invention, the second-level SPCs can also have a Control Interception directly to the Chief SCP thereby bypassing the first-level SCP running on the domain where the second-level SCP is being interpreted.

Operation

A typical operation using only two states is shown in the following TABLE 2.

TABLE 2

| Control State | Host State | Guest State |
|---|---|---|
| $I_0$ SIE ————> | | |
| | | $I_1$ |
| | | $I_2$ |
| | | $I_3$ Set Prefix |
| | <———— | |
| | (Host Emulation) | |
| | $I_a$ | |
| | $I_b$ | |
| | . | |
| | . | |
| | $I_j$ SIE ————> | |
| | | $I_4$ |

In TABLE 2, a SIE instruction transfer execution to a guest and execution of instructions being with $I_1$, $I_2$, and $I_3$. Since $I_3$ is a Set Prefix instruction, execution in the example described is transferred to the host for emulation by the host. The host executes instructions $I_a$, $I_b$, and so on until the $I_j$ SIE instruction is reached returning executions after emulation to the guest state for execution of $I_4$.

A typical operation in accordance with the present invention involving three states is shown in the following TABLE 3.

TABLE 3

| Control State | Host State | User State |
|---|---|---|
| | $I_0$ SIE ————> | |
| | | $I_1$ |
| | | $I_2$ |
| | | $I_3$ |
| | | $I_4$ |
| | | $I_5$ Divide Extended |
| <———— | <———— | |
| Chief SCP Emulation | | |
| $I_a$ | | |
| $I_b$ | | |
| . | | |
| . | | |
| Return ————> | ————> | |
| | | $I_6$ |

In TABLE 3, a SIE instruction transfers execution to a guest and execution of instructions begins with $I_1$, $I_2$, . . . , $I_5$. Since $I_5$ is a Divide Extended instruction, execution in the example described is transferred directly to the Chief SCP for emulation. The Chief SCP executes instructions $I_a$, $I_b$, and so on until the emulation is complete returning execution after emulation directly to the guest state for execution of $I_6$.

Another typical operation in accordance with the present invention is shown in the following TABLE 4.

TABLE 4

| Control State | Host State | User State |
|---|---|---|
| | $I_0$ SIE ---> | |
| | | $I_1$ |
| | | $I_2$ |
| | | $I_3$ Test Block |
| | | <--------- |
| | Host Emulation | |
| | $I_z$ | |
| | Test Block | |
| | <--------- | |
| Chief SCP Emulation | | |
| $I_a$ | | |
| $I_b$ | | |
| . | | |
| . | | |
| Return ---------> | ---------> | |
| | | $I_4$ |

In TABLE 4, a SIE instruction transfers execution to a guest and execution of instructions begins with $I_1$, $I_2$, ..., $I_3$. Since $I_3$ is a Test Block instruction, execution in the example described is transferred to the Host State for emulation. Again a Test Block instruction in the Host causes transfer of control to the Chief SCP for emulation. The Chief SCP executes instructions $I_a$, $I_b$, and so on until the emulation is complete returning execution after emulation directly to the guest state for execution of $I_4$.

In TABLE 5, a number of operations using the different units of operation in accordance with the present invention are shown.

TABLE 5

| Control State | Host User | Guest User |
|---|---|---|
| Dispatch User | | |
| (LPSWR) ---> | | |
| | Load ORB | |
| | Load GR1 | |
| | "SSCH" | |
| | <--------- | |
| Maintain UOP | | |
| Validate instruction | | |
| Start IO operation | | |
| Set CC | | |
| Return to User | | |
| (RUS) | | |
| | (end UOP) | |
| | SSCH | |
| | (PrivOp) | |
| | Host exception | |
| | Load Guest | |
| | Parameters in SD | |
| | SIE ---------> | |
| | | Load ORB |
| | | Load GR1 |
| | | SSCH |
| | | Check for spec. |
| | | exception. |
| | <--------- | <--------- |

TABLE 5-continued

| Control State | Host User | Guest User |
|---|---|---|
| Maintain UOP | | |
| Verify Host Controls | | |
| Validate instruction | | |
| Start IO OP | | |
| Set CC | | |
| Return to User ---> | (end UOP) ---> | |
| | | SSCH |
| | | Privop exception |
| | | Guest exception |
| | | Load ORB |
| | | Load GR1 |
| | <--------- | SSCH <--------- |
| Maintain UOP | | |
| Verify Host Controls | | |
| (fail) | | |
| Change User State in | | |
| RA to Host Mode | | |
| Return to User ---> | | |
| | (end UOP) | |
| | Host emulates | |
| | SIE ---------> | |
| | | SCCH |
| | | Check for spec. |
| | | exception |
| | | (fail) |
| | | <--------- |
| Host interception | | |

While the invention has been particularly shown and described with reference to preferred embodiments thereof it will be understood by those skilled in the art that various changes in form and details may be made therein without departing from the spirit and scope of the invention.

We claim:

1. A computer system formed of one or more data processing units for executing instructions, $I_1$, $I_2$, $I_3$, ..., $I_j$ where "j" is an integer, in a plurality of pipeline segments, including at least the segments $S_1$, $S_2$, ..., $S_k$, ..., $S_w$ where "$k$" and "$w$" are integers, said computer system having system storage common to the data processing units, said computer system including one or more data processing domains, each domain being a virtual computing system having corresponding domain storage in the system storage where the location and control of domain storage is determined by architectural control values, each domain having means for accessing the corresponding domain storage for execution of instructions, said computer system operating to multiplex instructions for the domains in the data processing units to execute programs for the domains, said computer system further comprising:

architectural control means for defining the architectural control values for each of said domains, state means for causing each domain to execute instructions in control state or user state, said control state for executing control-modifying instructions for modifying the architectural control values, detection means for detecting the execution in control state of any control-modifying instruction which can modify architectural control values for a domain, domain interlock means for locking pipeline segments to prevent further instruction execution by the domain during processing of the control-modifying instruction.

2. The computer system of claim 1 wherein said plurality of pipeline segments include the segments D, A, T, B, X, and W, wherein said D segment collates information to reference storage, wherein the A, T, and B segments fetch operands, wherein the X segment performs executions, and wherein the W segment writes results and wherein said domain storage remains interlocked in the D segment during processing of control-modifying instructions.

3. The computer system of claim 1 wherein instructions executed in control state are in a control state program executing to control the domains in the computer system.

4. The computer system of claim 3 wherein said interlock means operates to the control state program.

5. The computer system of claim 3 wherein the control state programs includes domain-access instructions together with the control-modifying instructions and wherein the control-modifying instructions are issued by the control state program independently of any timing of the domain-access instructions determined by the control state program.

6. The computer system of claim 1 wherein said architectural control means includes a register array for defining the architectural control values for a domain.

7. The computer system of claim 1 wherein said architectural control means includes a register array means for defining the architectural control values for each of said domains and said control-modifying instructions write control values into said register array means.

8. A computer system formed of a plurality of data processing units for executing instructions $I_1, I_2, I_3, \ldots, I_j$ where "$j$" is an integer, each of said processing units including a plurality of pipeline segments, including at least the segments $S_1, S_2, \ldots, S_k, \ldots, S_w$ where "$k$" and "$w$" are integers, said computer system having system storage common to the data processing units, said computer system including one or more data processing domains, each domain being a virtual computing system having corresponding domain storage in the system storage where the location and control of domain storage is determined by architectural control values, each domain having means for accessing the corresponding domain storage for execution of instructions, said computer system operating to execute instructions for the domains on the data processing units to execute programs for the domains, said computer system further comprising:

architectural control means for defining the architectural control values for each of said domains, state means for causing each domain to execute instruction in control state or user state, said control state for executing control-modifying instructions for modifying the architectural control values, detection means for detecting the execution in control state of any control-modifying instruction in any processing unit which can modify architectural control values for a domain, domain interlock means for locking pipeline segments to prevent further instruction execution by the domain during processing of the control-modifying instruction.

9. The computer system of claim 8 wherein said plurality of pipeline segments include the segments D, A, T, B, X, and W wherein said D segment collates information to reference storage, wherein the A, T, and B segments fetch operands, wherein the X segment performs executions, and wherein the W segment writes results and wherein said domain storage remains interlocked in the D segment during processing of control-modifying instructions.

10. The computer system of claim 8 wherein instructions executed in control state are in a control state program executing to control the domains in the computer system.

11. The computer system of claim 10 wherein said interlock means operates transparent to the control state program.

12. The computer system of claim 10 wherein the control state program includes domain-access instructions together with the control-modifying instructions and wherein the control-modifying instructions are issued by the control state program independently of the timing of the domain-access instructions by the control state program.

13. The computer system of claim 8 wherein said architectural control means includes a register array for defining the architectural control values for a domain.

14. The computer system of claim 8 wherein said architectural control means includes register array means for defining the architectural control values for each of said domains and said control-modifying instructions write control values into said register array means.

15. The computer system of claim 8 wherein said computer system includes a plurality of system control programs, one for each of said domains.

16. The computer system of claim 8 wherein said computer system includes a plurality of architectures, one for each of said domains, said architectures defined by the architectural control values in the architectural control means.

17. A computer system formed of a plurality of data processing units including processing units CPU(0), ..., CPU(n−1) processing units CPU(0), CPU(n−1) for executing instructions, $I_1, I_2, I_3, \ldots, I_j$ where "$j$" is an integer, in a plurality of pipeline segments, including at least the segments $S_1, S_2, \ldots, S_K, \ldots, S_W$ where "$K$" and "$W$" are integers, said computer system having system storage common to the data processing units, said computer system including a plurality of data processing domains including the domains Domain(1), ..., Domain(n) where "n" is an integer, each domain being a virtual computing system having corresponding domain storage in the system storage where the location and control of domain storage is determined by architectural control values, each domain having means for accessing the corresponding domain storage for execution of instructions, said computer system operating to execute instructions for the domains on the data processing units to execute user programs for the domains, said computer system further comprising:

architectural control means for defining architectures, including architectures Arch(1), ..., Arch(n), with architectural control values for each of said domains Domain(1), ..., Domain(n), respectively, said architectural control means including a register array for each of the processing units CPU(1), ..., CPU(n) including the register arrays RA(1), ..., RA(n), respectively, state means for causing each domain to execute instructions in control state or user state, said control state for executing control-modifying instructions for modifying the architectural control values in said register arrays, detection means for detecting the execution in control state of any control-modifying instruction which can modify architectural control values for a domain, domain interlock means for locking pipeline segments to prevent further instruction execution by the domain during processing of the control-modifying instruction.

18. The computer system of claim 17 wherein said computer system includes, for said plurality of domains Domain(1), ..., Domain(n), a plurality of system control programs including system control programs SCP(1), ..., SCP(n), respectively.

19. The computer system of claim 17 wherein said plurality of pipeline segments include the segments D, A, T, B, X, and W for each of said processing units wherein said D segments fetch operands, wherein the X segment performs executions, and wherein the W segment writes results and wherein said domain storage remains interlocked in the D segment during processing of control-modifying instructions.

20. The computer system of claim 17 wherein instructions executed in control state are in a control state program executing to control the domains in the computer system.

21. The computer system of claim 17 wherein said interlock means operates transparent to the control state program.

22. The computer system of claim 17 wherein the control state program includes domain-access instructions together with the control-modifying instructions and wherein the control-modifying instructions are issued by the control state program independently of any timing of the domain-access instructions determined by the control state program.

23. The computer system of claim 17 wherein said computer system includes, for said plurality of domains Domain(1), ..., Domain(n), a plurality of system control programs including system control programs SCP(1), ..., SCP(n), respectively, and includes a chief system control program for controlling said system control programs SCP(1), ..., SCP(n).

* * * * *